United States Patent
Lim et al.

(10) Patent No.: US 7,394,228 B2
(45) Date of Patent: Jul. 1, 2008

(54) SWITCHED RELUCTANCE GENERATOR WITH IMPROVED GENERATION EFFICIENCY IN LOW-SPEED RANGE

(75) Inventors: Jun-young Lim, Incheon (KR); Yong-won Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/319,473

(22) Filed: Dec. 29, 2005

(65) Prior Publication Data
US 2006/0232251 A1 Oct. 19, 2006

(30) Foreign Application Priority Data
Apr. 1, 2005 (KR) ................ 10-2005-0027620

(51) Int. Cl.
H02P 9/14 (2006.01)
F02B 63/04 (2006.01)
F03G 7/08 (2006.01)
H02K 7/18 (2006.01)
F02D 29/06 (2006.01)

(52) U.S. Cl. .............. 322/46; 290/1 R; 290/40 C
(58) Field of Classification Search ........... 290/1 R, 290/40 C; 322/46
See application file for complete search history.

(56) References Cited

U.S. PATENT DOCUMENTS

| | | | | |
|---|---|---|---|---|
| 4,338,557 A | * | 7/1982 | Wanlass | 318/729 |
| 4,574,225 A | * | 3/1986 | Pershall et al. | 318/400.26 |
| 4,959,596 A | * | 9/1990 | MacMinn et al. | 318/254.2 |
| 5,043,643 A | * | 8/1991 | Hedlund et al. | 318/254 |
| 5,231,338 A | * | 7/1993 | Bulgarelli et al. | 318/254 |
| 5,652,493 A | * | 7/1997 | Hendershot, Jr. | 318/701 |
| 5,793,179 A | * | 8/1998 | Watkins | 318/701 |
| 5,811,946 A | * | 9/1998 | Mullin et al. | 388/811 |
| 5,825,153 A | * | 10/1998 | Doyle | 318/701 |
| 5,847,524 A | * | 12/1998 | Erdman et al. | 318/400.14 |
| 6,014,003 A | * | 1/2000 | French | 318/701 |
| 6,051,942 A | * | 4/2000 | French | 318/254 |
| 6,150,778 A | * | 11/2000 | Morris | 318/254 |
| 6,392,380 B2 | * | 5/2002 | Furukawa et al. | 320/104 |

(Continued)

FOREIGN PATENT DOCUMENTS

JP 58-95999 6/1983

OTHER PUBLICATIONS

U.S. Appl. No. 11/296,306 to Lim et al., filed Dec. 8, 2005.

(Continued)

*Primary Examiner*—Julio Gonzalez
*Assistant Examiner*—Pedro J Cuevas
(74) *Attorney, Agent, or Firm*—Greenblum & Bernstein, P.L.C.

(57) ABSTRACT

Disclosed is an SR (switched reluctance) generator with improved generation capability in a low-speed range. The SR generator is configured such that an inductance of a phase winding wound around a stator is increased in a low-speed range and is reduced in a high-speed range. Accordingly, a variation rate of the inductance relative to a phase angle is increased in a low-speed range, resulting in an increased output energy in a low-speed range and an improved generation efficiency. The phase winding of the stator may be configured to have a single phase. Accordingly, since the generator is configured with the reduced number of switches, it can be manufactured inexpensively and simply.

10 Claims, 6 Drawing Sheets

U.S. PATENT DOCUMENTS

| | | | |
|---|---|---|---|
| 6,396,237 B2 * | 5/2002 | Mayes | 318/701 |
| 6,591,593 B1 * | 7/2003 | Brandon et al. | 56/10.6 |
| 6,624,538 B2 * | 9/2003 | Janisiewicz et al. | 310/12 |
| 6,661,206 B2 * | 12/2003 | Gallegos-Lopez | 322/23 |
| 6,717,281 B1 * | 4/2004 | Brandon et al. | 290/40 C |
| 6,774,664 B2 * | 8/2004 | Godbersen | 324/772 |
| 6,856,035 B2 * | 2/2005 | Brandon et al. | 290/40 C |
| 6,930,460 B2 * | 8/2005 | Ishikawa et al. | 318/442 |
| 6,938,713 B1 * | 9/2005 | Tahara et al. | 180/65.3 |
| 6,987,328 B2 * | 1/2006 | Osborne | 290/1 R |
| 7,015,664 B2 * | 3/2006 | Coles et al. | 318/254 |
| 7,256,567 B2 * | 8/2007 | Kawamura | 322/46 |
| 7,315,091 B2 * | 1/2008 | Obayashi et al. | 290/40 C |
| 7,330,014 B2 * | 2/2008 | Obayashi | 322/24 |
| 2001/0026139 A1 * | 10/2001 | Mayes | 318/701 |
| 2001/0026142 A1 * | 10/2001 | Furukawa et al. | 320/103 |
| 2003/0146726 A1 * | 8/2003 | Ishikawa et al. | 318/442 |
| 2004/0021437 A1 * | 2/2004 | Maslov et al. | 318/254 |
| 2004/0130159 A1 * | 7/2004 | Brandon et al. | 290/40 C |
| 2005/0029816 A1 * | 2/2005 | Brandon et al. | 290/40 C |
| 2005/0184689 A1 * | 8/2005 | Maslov et al. | 318/254 |
| 2005/0269982 A1 * | 12/2005 | Coles et al. | 318/254 |
| 2006/0049809 A1 * | 3/2006 | Sasaki | 322/89 |
| 2006/0232069 A1 * | 10/2006 | Lim et al. | 290/1 R |
| 2006/0232251 A1 * | 10/2006 | Lim et al. | 322/89 |
| 2006/0273766 A1 * | 12/2006 | Kawamura | 322/46 |
| 2006/0290216 A1 * | 12/2006 | Burse | 310/90.5 |

OTHER PUBLICATIONS

English language Abstract of JP 58-95999, Jun. 7, 1983.

* cited by examiner

Winding

SWITCHED RELUCTANCE GENERATOR WITH IMPROVED GENERATION EFFICIENCY IN LOW-SPEED RANGE

BACKGROUND OF THE INVENTION

This application claims the priority of Korean Patent Application No. 2005-27620, filed on Apr. 1, 2005, in the Korean Intellectual Property Office, the disclosure of which is incorporated herein in its entirety by reference.

1. Field of the Invention

The present invention relates to a switched reluctance (SR) generator and, more particularly, to an SR generator with improved generation capability in a low-speed range.

2. Description of Related Art

An SR generator is an energy conversion device which, through electronic switching, applies electrical energy from a voltage source to a winding having at least one phase over a prescribed range of rotor angle and receives back from the phase winding over a later range of rotor angle a larger quantity of energy than previously applied. This additional energy is mechanical energy, imparted to the generator rotor by applying a torque in the direction of rotation. Such an SR generator is advantageous in that it can generate energy in a low-speed range since it outputs in a form of a current source.

Conventionally, induction generators or synchronous generators have been used as wind generators. The induction generator is simple in structure and is inexpensive, while there are disadvantages in that it needs an additional gear box to keep a constant speed upon generating electricity and a speed range of wind necessary to generate electricity is limited. Meanwhile, there are disadvantages in that the synchronous generator is complex in structure and is expensive. In addition, in the synchronous generator, a battery is not charged at low wind speeds since voltage outputted from the generator is small. Accordingly, it is very difficult to generate electricity using the induction generators or synchronous generators in an area where the wind speed is low, such as in Korea. While developing a generator that is able to efficiently generate electricity by wind power even in a low-speed range, the present inventor has found it possible to improve the SR generator to be applied to such an area.

SUMMARY OF THE INVENTION

The present invention provides an SR generator capable of generating electricity in a low-speed range.

The present invention further provides an SR generator that is simple in structure and is durable.

According to an aspect of the present invention, there is provided an SR generator which is configured such that an inductance of a phase winding wound around a stator is increased in a low-speed range and is reduced in a high-speed range.

Accordingly, a variation rate of the inductance relative to a phase angle is increased in a low-speed range, resulting in an increased output energy in a low-speed range and an improved generation efficiency.

The phase winding of the stator may be configured to have a single phase. Accordingly, since the generator is configured with the reduced number of switches, it can be manufactured inexpensively and simply.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 1:
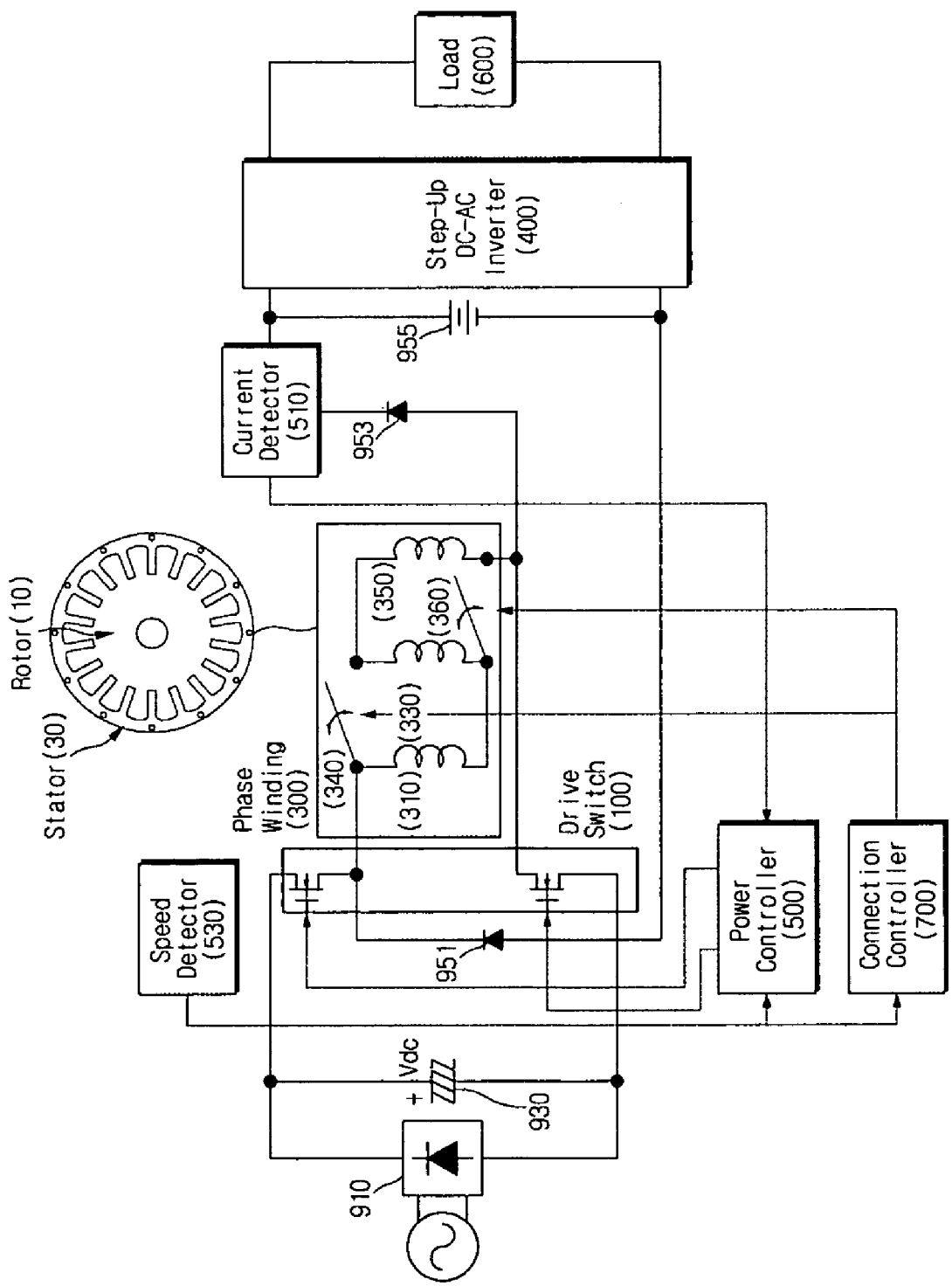
FIG. 1 is a block diagram showing a construction of an SR generator in accordance with an embodiment of the present invention.

FIG. 1 is a block diagram showing a construction of an SR generator in accordance with an embodiment of the present invention. As shown in FIG. 1, the SR generator includes a rotor 10, a stator 30 around which a phase winding is wound, a drive switch 100 controlling current flowing in the phase winding 300, and a power controller 500 controlling switching of the drive switch 100. The SR generator is configured such that an inductance of the phase winding 300 becomes larger in a low-speed range and becomes smaller in a high-speed range.

The SR generator according to an embodiment of the present invention includes the phase winding 300 having a plurality of unit windings 310, 330, 350 and at least one winding switch 340, 360 connecting/disconnecting the unit windings to one another, a speed detector 530 detecting a rotation speed of the rotor, and a connection controller 700 controlling switching of the winding switches 340, 360 according to the speed detected by the speed detector 530 so that the inductances of the windings become larger in a low-speed range and become smaller in a high-speed range.

Meanwhile, a single-phase SR generator requires an initial excitation current. For this purpose, a stand-alone generation system drives a small-sized synchronous motor provided parallel to a generator to supply necessary power. In FIG. 1, a current source 910 and a capacitor 930 are shown to represent such an initial excitation current system. In the present embodiment, the phase winding 300 of the stator is a single-phase winding. The single-phase SR generator can be produced at a low price since it needs only a few switches for energy conversion. However, the present invention is not limited thereto.

Through electronic switching of the drive switch 100, the phase winding 300 receives an electrical energy from the capacitor 930, a voltage source, over a prescribed range of rotor angle and supplies to a battery 955 over a later range of rotor angle a larger quantity of energy than previously received. The power controller 500 controlling the electronic switching of the drive switch 100 outputs a pulse-width modulation signal to control the electronic switching according to the position of the rotor detected by the speed detector 530. In addition, the power controller 500 adjusts the pulse-width modulation signal to prevent overcurrent by detecting an output current of the generator through the current detector 510. Meanwhile, various types of power controllers 500 are well known in the art. In addition, various types of speed detectors 530 using a hall sensor or a current detection method are well known in the art. For example, the speed detector 530 can detect the speed by detecting and differentiating a displacement or by counting a sequence of pulses outputted from an encoder for a predetermined time interval.

According to the present embodiment, the SR generator further includes a battery 955 to which a current outputted from the phase winding 300 of the stator is charged, and a step-up DC-AC inverter 400 stepping up an output voltage of the battery 955. The output of the inverter 400 is supplied to a load 600. Diodes 951, 953 act to prevent the electrical power charged to the battery from flowing backward to the phase winding.

Operation of the connection controller 700 according to the present invention will now be described with reference to FIG. 1. The connection controller 700 controls switching of the winding switches 340, 360 in the phase winding 300 according to the speed detected by the speed detector 530 to change a connection method of the unit windings 310, 330, 350.

A voltage equation of the SR generator is expressed as follows:

$$v = Ri + \frac{d\phi}{dt} = Ri + L\frac{di}{dt} + i\frac{d\theta}{dt}\frac{dL}{d\theta} = Ri + L\frac{di}{dt} + e \quad \text{[Equation 1]}$$

where $$e = i\frac{d\theta}{dt}\frac{dL}{d\theta} = i\omega_m \frac{dL}{d\theta} \quad \text{[Equation 2]}$$

Figure 2:
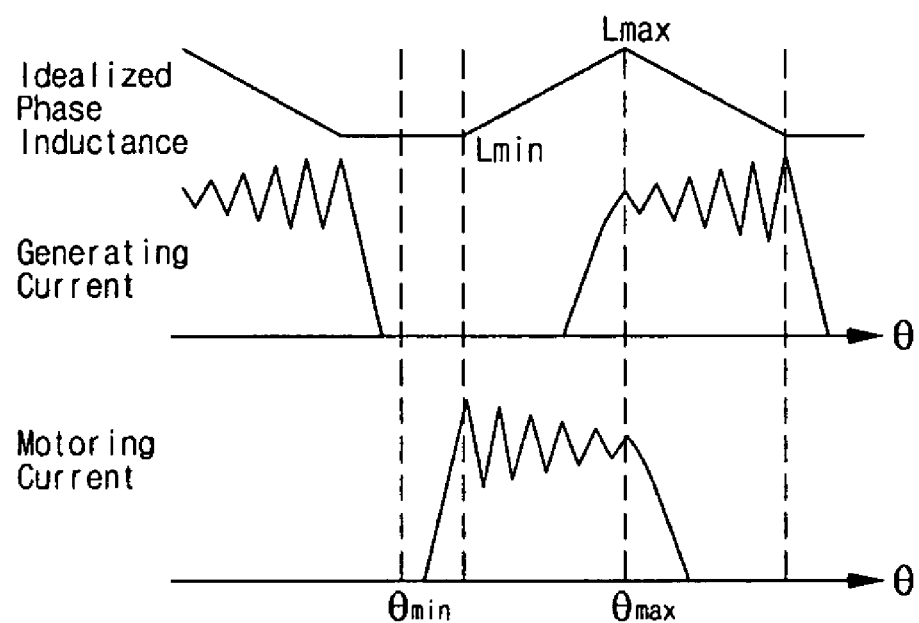
FIG. 2 is a graph showing relations between a phase inductance of a rotor relative to a phase angle and a generating current and a motoring current in an SR generator.

Thus, the energy flow is expressed as follows:

$$vi = Ri^2 + Li\frac{di}{dt} + i^2\frac{d\theta}{dt}\frac{dL}{d\theta} = Ri^2 + \frac{d}{dt}\left(\frac{1}{2}Li^2\right) + \frac{1}{2}i^2\omega_m\frac{dL}{d\theta} \quad \text{[Equation 3]}$$

where the first term indicates a copper loss, the second term indicates {core loss+magnetic energy}, and the third term indicates a mechanical output, a generation power. It is operated as a motor over a range of $dL/d\theta>0$ since the mechanical output is positive (+). Meanwhile, it is operated as a generator over a range of $dL/d\theta>0$ since the mechanical output is negative (−). FIG. 2 is a graph showing relations between a phase inductance of a rotor relative to a phase angle and a generating current and a motoring current in the SR generator. As shown in FIG. 2, the inductance has a maximum value Lmax at $\theta=\theta max$, while the inductance has a minimum value Lmin at $\theta=\theta min$.

Figure 3:
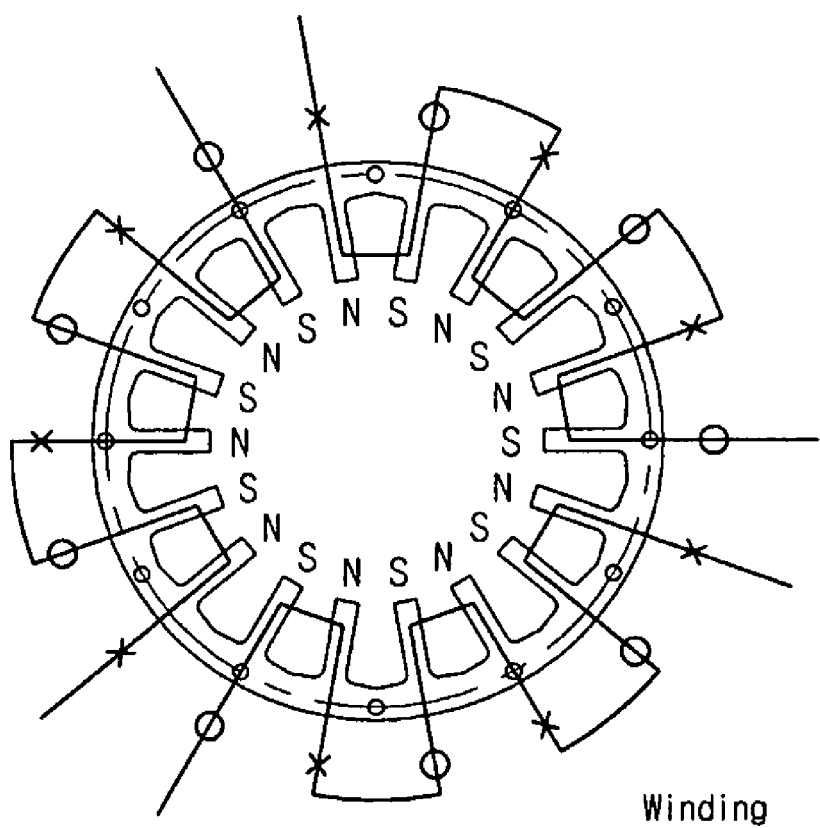
FIG. 3 is a view showing a connection structure of a single-phase stator in an SR generator in which a phase winding is made up of three unit windings.

The connection controller 700 according to an embodiment of the present invention controls a connection between the respective unit windings so that the respective unit windings are connected in series to each other in a low-speed range and connected in parallel to each other in a high-speed range. FIG. 1 shows an embodiment in which the single-phase phase winding 300 is made up of three unit windings 310, 330, 350 and two winding switches 340, 360 controlling a connection between the three unit windings. FIG. 3 shows a connection structure of the stator in the SR generator. In this embodiment, the unit windings are assigned to the respective groups consisting of the equal number of adjacent stator magnetic poles equally divided from the stator magnetic poles which are radially arranged. At this time, the respective unit windings are wound around the stator so that polarities of adjacent magnetic poles in the respective groups are alternated with each other. That is, the respective magnetic poles have polarities opposite to those of adjacent magnetic poles. The magnetic poles are divided by the three unit windings into three groups of magnetic poles each of which is wound by a single unit winding. In FIG. 3, the symbol "o" or "x" denotes a wound direction. Increasing the number of magnetic poles and improving a connection method of windings make it possible to achieve a higher energy efficiency in a low-speed range.

Figure 4A:
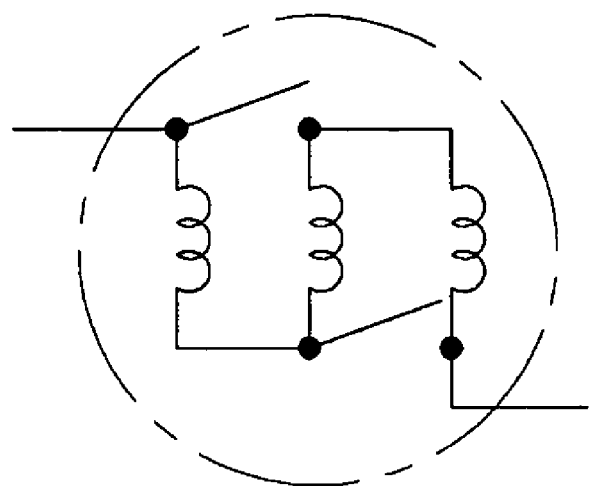
FIG. 4A is a view showing a connection method of the stator having the connection structure shown in FIG. 3 in a low-speed range.
Figure 4B:
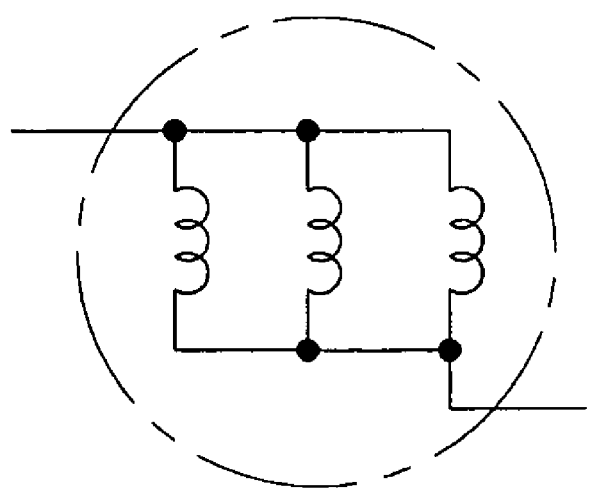
FIG. 4B is a view showing a connection method of the stator in a high-speed range.
Figure 5A:
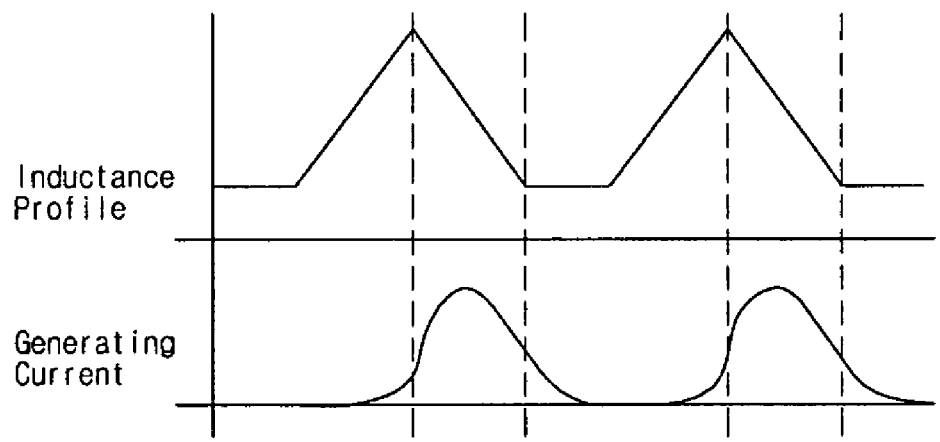
FIG. 5A is a view showing a relation between an inductance and a generating current in a low-speed range in the stator having the connection structure shown in FIG. 3.
Figure 5B:
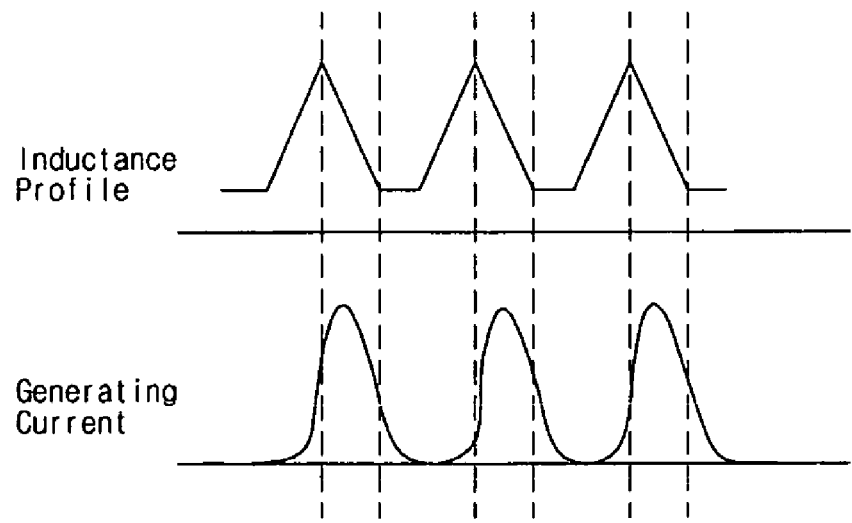
FIG. 5B is a view showing a relation between an inductance and a generating current in a high-speed range in the stator shown in FIG. 3.

FIG. 4A shows a connection method of the stator having the connection structure shown in FIG. 3 in a low-speed range. FIG. 4B shows a connection method of the stator in a high-speed range. FIG. 5A shows a relation between an inductance and a generating current in a low-speed range in the stator having the connection structure shown in FIG. 3. FIG. 5B shows a relation between an inductance and a generating current in a high-speed range in the stator having the connection structure shown in FIG. 3.

As shown in Equation 3, the energy generated in the SR generator is expressed as follows:

$$\text{Energy} = \frac{1}{2}i^2\omega_m\frac{dL}{d\theta} \quad \text{[Equation 4]}$$

As can be seen from an inductance profile shown in FIG. 5A, since the unit windings are connected in series to each other in a low-speed range, the inductance becomes large. Thus, since Lmax and Lmin are increased, $dL/d\theta$ becomes large, thereby increasing generation efficiency. Further, in terms of an excitation current, Lmax is large in a low-speed range. However, since the speed is low, a time period required for excitation is sufficiently allowed so that a sufficient excitation current can be obtained. Accordingly, the sufficient amount of energy can be generated in a low-speed range since $dL/d\theta$ is large despite a low angular speed w.

Figure 6:
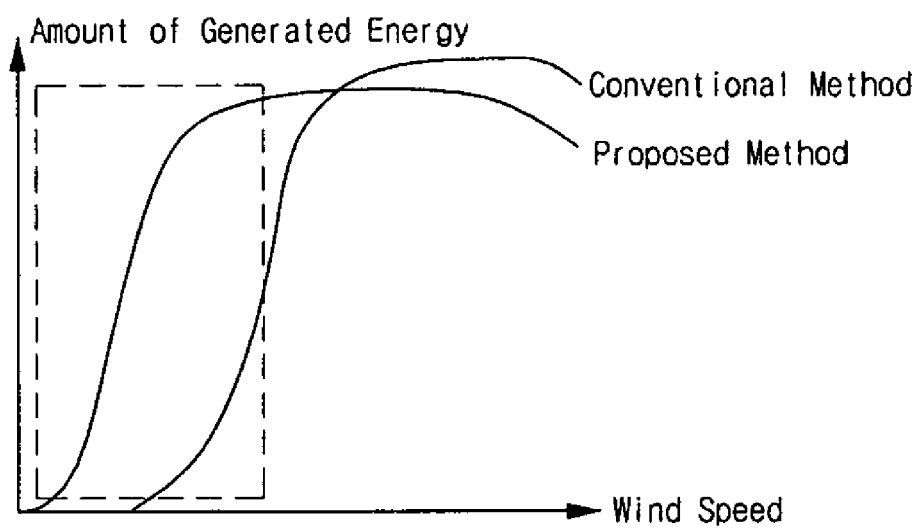
FIG. 6 is a graph showing the amount of generated energy relative to wind speed in an SR generator according to an embodiment of the present invention.

Meanwhile, since the unit windings are connected in parallel to each other in a high-speed range, the inductance is reduced. Thus, since Lmax and Lmin are reduced, $dL/d\theta$ becomes small. However, since the angular speed w is large, the sufficient amount of energy can be generated in a high-speed range. FIG. 6 is a graph showing the amount of generated energy relative to wind speed in an SR generator according to an embodiment of the present invention. It can be seen from a dotted area shown in the drawing that generation efficiency has been improved in a low-speed range.

As apparent from the above description, the SR generator according to the present invention is configured such that the inductance of the phase winding wound around the stator is increased in a low-speed range and is reduced in a high-speed range. Accordingly, since a variation rate of the inductance relative to the phase angle becomes large in a low-speed range, output energy is increased in a low-speed range, thereby improving generation efficiency.

Further, the SR generator according to the present invention is configured such that the phase winding of the stator is configured to have a single phase. Accordingly, the number of switches is reduced, thereby reducing the cost.

While the present invention has been described with reference to exemplary embodiments thereof, it will be understood by those skilled in the art that various changes in form and details may be made therein without departing from the scope of the present invention as defined by the following claims.

What is claimed is:

1. A switched reluctance (SR) generator comprising a stator having a phase winding wound around the stator,
    wherein an inductance of the phase winding when the generator operates in a low-speed range is higher than an inductance of the phase winding when the generator operates in a high-speed range,
    the phase winding includes a plurality of unit windings and at least one winding switch that switches a connection between the unit windings, and
    the SR generator further comprises:
    a speed detector that detects a rotation speed of a rotor corresponding to the stator; and
    a connection controller that controls the switching of the winding switch according to the speed detected by the speed detector such that the inductance of the phase winding becomes higher in the low-speed range and lower in the high-speed range.

2. The SR generator of claim 1, wherein the winding switch connects the unit windings in series in the low-speed range and in parallel in the high-speed range.

3. The SR generator of claim 1, further comprising:
    a battery that charges itself with an output current from the phase winding of the stator; and
    a step-up DC-AC inverter that steps up an output voltage from the battery.

4. The SR generator of claim 1, wherein the phase winding is a single-phase winding.

5. The SR generator of claim 1, wherein each of the unit windings of the phase winding is assigned to a corresponding one of a plurality of groups of magnetic poles of the stator so as to be wound around the corresponding group such that adjacent ones of the magnetic poles in the corresponding group have alternating polarities, the magnetic poles of the plurality of groups being radially arranged and being equally divided in number to constitute corresponding ones of the groups, respectively.

6. A switched reluctance (SR) generator comprising:
    a rotor;
    a stator having a phase winding wound therearound;
    a drive switch that controls current flowing in the phase winding; and
    a power controller that controls switching of the drive switch,
    wherein an inductance of the phase winding when the generator operates in a low-speed range is higher than an inductance of the phase winding when the generator operates in a high-speed range,
    the phase winding includes a plurality of unit windings and at least one winding switch that switches a connection between the unit windings, and
    the SR generator further comprises:
    a speed detector that detects a rotation speed of the rotor; and
    a connection controller that controls the switching of the winding switch according to the speed detected by the speed detector such that the inductance of the phase winding becomes higher in the low-speed range and lower in the high-speed range.

7. The SR generator of claim 6, wherein the connection controller controls the switching of the winding switch such that the winding switch connects the unit windings in series in the low-speed range and in parallel in the high-speed range.

8. The SR generator of claim 6, wherein the phase winding of the stator is a single-phase winding.

9. The SR generator of claim 8, wherein each of the unit windings is assigned to a corresponding one of a plurality of groups of magnetic poles of the stator so as to be wound around the corresponding group such that adjacent ones of the magnetic poles in the corresponding group have alternating polarities, the magnetic poles of the plurality of groups being radially arranged and being equally divided in number to constitute corresponding ones of the groups, respectively.

10. The SR generator of claim 6, further comprising:
    a battery that charges itself with an output current from the phase winding of the stator; and
    a step-up DC-AC inverter that steps up an output voltage from the battery.

* * * * *